(12) United States Patent
Kato et al.

(10) Patent No.: US 7,430,370 B2
(45) Date of Patent: Sep. 30, 2008

(54) OPTICAL ELEMENT, LENS UNIT AND IMAGE PICKUP APPARATUS

(75) Inventors: Takashi Kato, Minami-Ashigara (JP); Tomonori Masuda, Asaka (JP); Hitoshi Miyano, Saitama (JP)

(73) Assignees: Fujinon Corporation, Saitama (JP); FUJIFILM Corporation, Tokyo (JP)

( * ) Notice: Subject to any disclaimer, the term of this patent is extended or adjusted under 35 U.S.C. 154(b) by 462 days.

(21) Appl. No.: 11/201,323

(22) Filed: Aug. 11, 2005

(65) Prior Publication Data

US 2006/0047039 A1    Mar. 2, 2006

(30) Foreign Application Priority Data

Aug. 26, 2004 (JP) ............................. 2004-246718

(51) Int. Cl.
*G03B 3/00* (2006.01)
(52) U.S. Cl. .................. 396/89; 396/506; 359/252; 359/253; 359/272
(58) Field of Classification Search ............... 396/89, 396/506; 359/252, 253, 272
See application file for complete search history.

(56) References Cited

U.S. PATENT DOCUMENTS

| 6,369,954 | B1 * | 4/2002 | Berge et al. ............... 359/666 |
| 6,449,081 | B1 * | 9/2002 | Onuki et al. ............... 359/245 |
| 6,702,483 | B2 * | 3/2004 | Tsuboi et al. .............. 396/449 |
| 7,224,534 | B2 * | 5/2007 | Ootsuka et al. ............ 359/665 |
| 7,307,672 | B2 * | 12/2007 | Feenstra et al. ............ 349/15 |
| 2002/0176148 | A1 * | 11/2002 | Onuki et al. ............... 359/253 |
| 2003/0227100 | A1 * | 12/2003 | Chandross et al. ......... 264/1.36 |
| 2004/0227063 | A1 * | 11/2004 | Viinikanoja ............... 250/216 |
| 2004/0228002 | A1 * | 11/2004 | Schrader .................. 359/666 |
| 2005/0113912 | A1 * | 5/2005 | Feenstra et al. ............ 623/6.13 |
| 2005/0199720 | A1 * | 9/2005 | Barkan ..................... 235/454 |
| 2005/0264864 | A1 * | 12/2005 | Onuki et al. ............... 359/253 |
| 2006/0028734 | A1 * | 2/2006 | Kuiper et al. .............. 359/676 |
| 2006/0215273 | A1 * | 9/2006 | Kuiper et al. .............. 359/666 |
| 2006/0279848 | A1 * | 12/2006 | Kuiper et al. .............. 359/666 |
| 2007/0146893 | A1 * | 6/2007 | Kuiper et al. .............. 359/666 |

FOREIGN PATENT DOCUMENTS

JP    2001-13306 A    1/2001

OTHER PUBLICATIONS

"Philips' Fluid Lenses", [online] Mar. 3, 2004, Royal Philip Electronics, [searched on Mar. 31, 2004], Internet. {URL:http://www.dpreview.com/news/0403/04030302philipsfluidlens.asp.}

* cited by examiner

*Primary Examiner*—W. B. Perkey
*Assistant Examiner*—Warren K Fenwick
(74) *Attorney, Agent, or Firm*—Sughrue Mion, PLLC

(57) ABSTRACT

An optical element and a lens unit each includes: a liquid container transmitting light at least in a predetermined optical axis direction, the liquid container containing an insulating liquid and an ionic liquid being mutually immiscible and optically transparent, and having different refractive indices; a first electrode contacting the ionic liquid in the liquid container; and a second electrode insulated from the ionic liquid in the liquid container. The ionic fluid is not subject to electrolysis and does not evaporate easily even at high temperature. Accordingly, the optical element, the lens unit and an image taking apparatus having the optical element can maintain high light-transmission and optical characteristics over a long period even in a high temperature environment.

15 Claims, 6 Drawing Sheets

OPTICAL ELEMENT, LENS UNIT AND IMAGE PICKUP APPARATUS

BACKGROUND OF THE INVENTION

1. Field of the Invention

The present invention relates to an optical element transmitting light, a lens unit and an image pickup apparatus having subject light focused to obtain image data.

2. Description of the Related Art

There are cameras having a zoom function of freely setting a shooting field angle among electronic still cameras providing an image of a subject on a solid-state image sensing device such as a charge coupled device (CCD) and retrieving image data representing the subject as a signal and film cameras doing a photo shoot on a photographic film. Such cameras are equipped with an image taking lens of which focal length varies according to operation of a zoom switch. The image taking lens is generally a compound lens composed of a combination of multiple lens elements, where relative positions of the multiple lens elements are adjusted according to the focal length set up by the zoom switch. Such cameras have a cam mechanism. The cam mechanism conveys rotations of a motor according to the operation of the zoom switch, and the multiple lens elements thereby move back and forth in an optical axis direction respectively so as to adjust the relative positions and change the focal length.

There is a focus lens for focus adjustment among the multiple lens elements. There are the cases where a lens drive mechanism moving this focus lens is provided separately from the cam mechanism.

In recent years, there has been a proposal of a liquid lens of a variable focal length having two kinds of liquid of mutually different refractive indexes and mutually unmixable accommodated therein instead of the image taking lens having the drive mechanism (for instance refer to Non-patent Document, "Philips' Fluid Lenses", [online], Mar. 3, 2004, Royal Philips Electronics, [searched on Mar. 31 ,2004],Internet, hereafter referred to as Non-patent document 1.)

The liquid lens proposed in Nonpatent Document 1 has two kinds of liquid of mutually different refractive indexes and mutually unmixable accommodated therein. One of the two kinds of liquid is a conductive solution having a supporting electrolyte dissolved therein, and the other liquid is insulating oil. These liquids are accommodated in a liquid container which is composed of a short glass tube having both ends thereof closed up by light-transmitting transparent end caps. Inner walls of this tube and one of the end caps are covered with a water-repellent film. In the case of the liquid lens thus configured, of the two kinds of liquid, the conductive solution repels the inner walls of the tube and one of the end caps covered with the water-repellent film. And the conductive solution stays in a semispherical form in contact with the other end cap, and so an interface portion between the conductive solution and the insulating oil functions as a concave lens. The liquid lens also has two electrodes for the sake of applying a voltage to the conductive solution, where one of the two electrodes is placed to contact the conductive solution while the other electrode is placed in the back of the water-repellent film. If the voltage is applied to such electrodes, electric charge is emitted from the electrode placed to contact the conductive solution into the conductive solution so that there occurs a phenomenon in which the emitted charge stays in the interface portion with the insulating oil in the conductive solution. The charge staying in the interface portion and the charge of reverse polarity to that charge gathered on the electrode placed in the back of the water-repellent film draw each other with a coulomb force so as to attract the charge in the conductive solution around the water-repellent film. Consequently, the conductive solution starts to wet the water-repellent film covering the inner wall of the tube, causing change of an interface form of the two kinds of liquid. To be more specific, as the higher voltage is applied to the conductive solution, a change occurs to a curvature radius of the interface portion with the insulating oil of the conductive solution initially functioning as the concave lens. For instance, the interface portion becomes completely flat or the conductive solution starts to function as the convex lens, resulting in a change in the focal length.

According to such a liquid lens, it is possible to change the focal length without moving the lens, so the zoom function and a focus function can be performed without providing the cam mechanism and lens drive mechanism. Therefore, by using the liquid lens, the apparatus can be substantially downsized, and the lens can also be applicable to a small device such as a cellular phone.

According to the liquid lens described in Nonpatent Document 1, however, the conductive solution is electrolyzed by the electric charge emitted from the electrode. Therefore, there is a problem that, if used for a long period of time, a generated gas stays in the liquid container and turns into bubbles, scattering of light occurs and light transmission lowers.

There is also a problem that, if the liquid lens described in Nonpatent Document 1 is used in a car in midsummer, the conductive solution becomes volatile in a temperature environment of approximately 100 degrees and performance of the lens is thereby deteriorated.

SUMMARY OF THE INVENTION

The present invention has been made in view of the above circumstances and provides an optical element, a lens unit and an image pickup apparatus capable of maintaining optical performance in a high temperature environment and maintaining light transmission for a long period of time.

The optical element of the present invention is the one including:

a liquid container transmitting light at least in a predetermined optical axis direction, the liquid container containing an insulating liquid and an ionic liquid being mutually immiscible and optically transparent, and having different refractive indices;

a first electrode contacting the ionic liquid in the liquid container; and a second electrode insulated from the ionic liquid in the liquid container.

The ionic liquid is an ionic compound composed of a cationic compound and an anionic compound, and is an organic salt which remains a liquid even at ordinary temperature. The ionic liquid is characterized by having high conductivity, not becoming electrolyzed, not evaporating even at high temperature (vapor pressure is zero) and not easily catching fire.

According to the optical element of the present invention, if a voltage is applied mutually between the first electrode and the second electrode, electric charge is emitted from the first electrode into the ionic liquid and the electric charge of reverse polarity thereto is gathered on the second electrode. Consequently, the electric charge in the ionic liquid and the electric charge gathered on the second electrode draw each other with a coulomb force so that a form of an interface between the ionic liquid and the insulating liquid is changed. In this case, a weak current passes through the ionic liquid due to the electric charge emitted from the first electrode. However, the ionic liquid is not easily electrolyzed, and so generation of bubbles is avoided and the light transmission is maintained for a long period of time. The ionic liquid is also characterized by keeping low viscosity and high conductivity, not becoming volatile and not easily catching fire even at high temperature, so that the optical performance and prolonged safety can be maintained even when applied to the image pickup apparatus for outdoor or in-car use.

As for the optical element of the present invention, it is desirable that the insulating liquid be an organic medium.

A difference in conductivity is significant between the ionic liquid and the organic medium, and so these liquids are combined to change the form of the interface between the liquids efficiently with high accuracy.

As for the optical element of the present invention, it is desirable that the insulating liquid is a hydrocarbon organic medium.

As the hydrocarbon organic medium is applied, temporal stability of the optical element is improved.

As for the optical element of the present invention, it is desirable that the ionic liquid be an imidazolium salt compound.

The imidazolium salt compound is easily available, and so manufacturing cost of the optical element can be reduced.

The lens unit of the present invention is the one including:

a liquid container transmitting light at least in a predetermined optical axis direction, the liquid container containing an insulating liquid and an ionic liquid being mutually immiscible and optically transparent, and having different refractive indices;

a first electrode contacting the ionic liquid in the liquid container; and a second electrode insulated from the ionic liquid in the liquid container, wherein a form of an interface between the insulating liquid and the ionic liquid varies according to a voltage applied between the first electrode and the second electrode.

According to the lens unit of the present invention, it is possible to maintain the light transmission characteristics and the optical performance for a long period of time in the high temperature environment as with the optical element of the present invention.

As for the lens unit according to the present invention, only its basic form is shown here. However, it is for the sake of avoiding duplication, and the lens unit according to the present invention includes various forms corresponding to the forms of the optical element in addition to the basic form.

The image pickup apparatus of the present invention is the one including:

a liquid container transmitting light at least in a predetermined optical axis direction, the liquid container containing an insulating liquid and an ionic liquid being mutually immiscible and optically transparent, and having different refractive indices;

a first electrode contacting the ionic liquid in the liquid container;

a second electrode insulated from the ionic liquid in the liquid container;

a control section varying a form of an interface between the insulating liquid and the ionic liquid by applying a voltage between the first electrode and the second electrode; and an image pickup device which has subject light having passed through the insulating liquid and the ionic liquid focused on its surface to generate an image signal representing the subject light.

According to the image pickup apparatus of the present invention, it is possible to maintain the light transmission for a long period of time and maintain the optical performance in the high temperature environment as with the optical element of the present invention.

As for the image pickup apparatus according to the present invention, only its basic form is shown here. However, it is for the sake of avoiding duplication, and the image pickup apparatus according to the present invention includes various forms corresponding to the forms of the optical element in addition to the basic form.

According to the present invention, it is possible to provide the optical element, lens unit and image pickup apparatus capable of maintaining the light transmission and the optical performance for a long period of time in the high temperature environment.

BRIEF DESCRIPTION OF THE DRAWINGS

Preferred embodiments of the present invention will be described in detail based on the following figures, wherein.

DETAILED DESCRIPTION OF THE INVENTION

Hereunder, problems of the liquid lens described in Non-patent Document 1 will be analyzed in detail before describing embodiments of the present invention.

Figure 1:
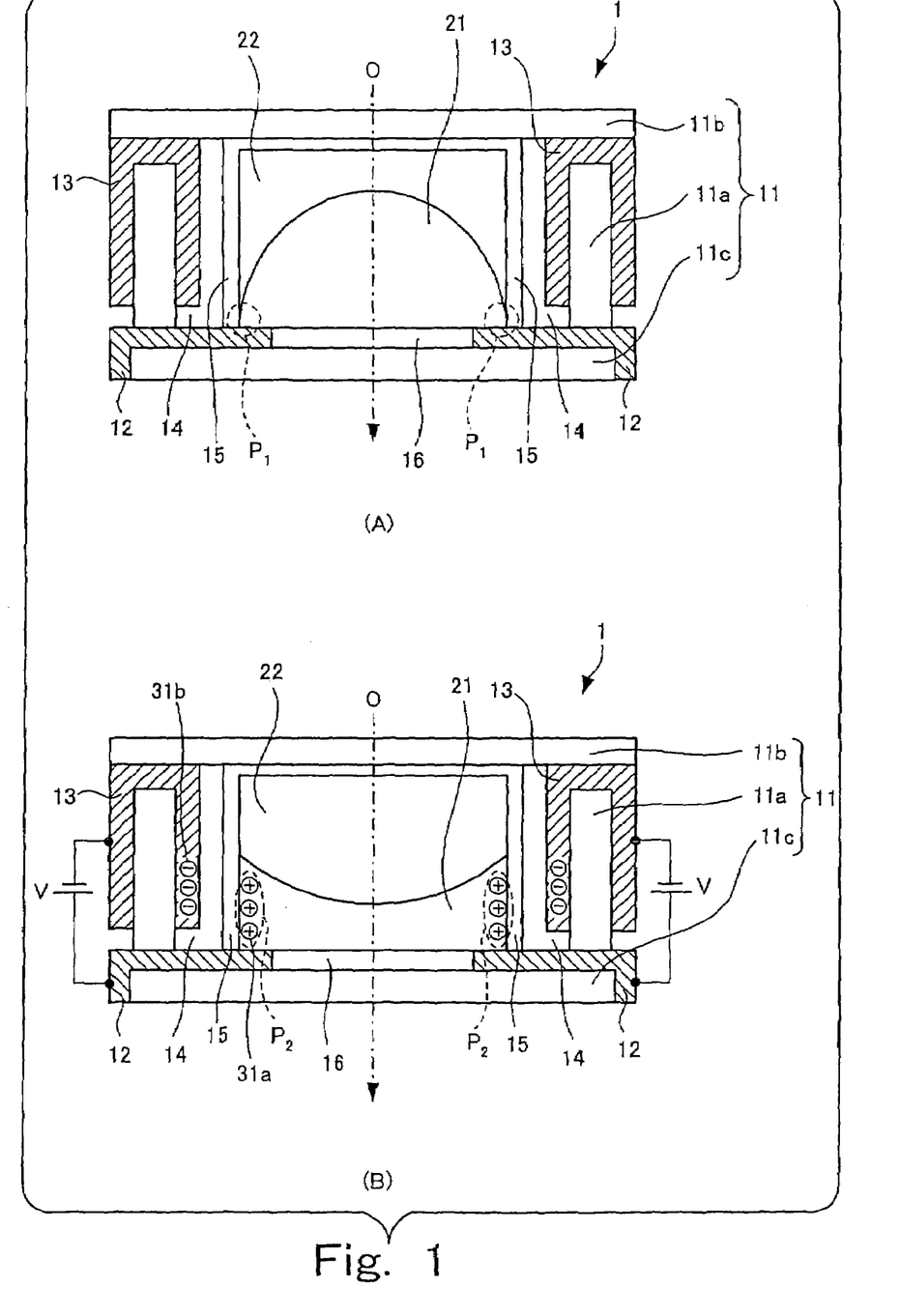
FIG. 1 is a schematic block diagram of a liquid lens as a comparative example.

FIG. 1 is a schematic block diagram of the liquid lens as a comparative example. Hereunder, light transmits in a direction of an arrow O, where a light incident side (upside of FIG. 1) is designated as the upside and a light outgoing side (downside of FIG. 1) as the downside.

As shown in FIG. 1, a liquid lens 1 has a clear water 21 to which supporting electrolyte is added and a clear oil 22 which is an insulating liquid without being mutually mixed in a glass container 11 which is composed of a glass tube 11a having both ends thereof closed up by glass caps 11b and 11c. As the oil 22 has a larger refractive index than the water 21, the oil 22 plays a role of the lens refracting the light in the liquid lens 1.

An inner surface of the tube 11a of the container 11 and the inner surface of the cap 11b closing up an upper end of the tube 11a are covered with a water-repellent film 15, and the inner surface of the cap 11c closing up a lower end of the tube 11a is covered with a hydrophilic film 16.

An insulating film 14 is provided between the tube 11a and the water-repellent film 15. And the liquid lens 1 has a first electrode 12 contacting the water 21 and a second electrode 13 insulated from the water 21 by the insulating film 14 provided thereto.

As shown in Part (A) of FIG. 1, in a state of having no voltage applied mutually between the first electrode 12 and the second electrode 13, the water 21 repels the water-repellent film 15 and contacts the hydrophilic film 16 so that a contact portion $P_1$ between the water 21 and the water-repellent film 15 becomes smaller. For this reason, the water 21 stays in a semispherical form, and the oil 22 pushed by the water 21 stays in a form having a semisphere bored out of a cylindrical form. As the form of an interface between the water 21 and the oil 22 viewed from the oil 22 is in a concave state, the liquid lens 1 functions as a concave lens in Part (A) of FIG. 1.

If a plus voltage is applied to the first electrode 12 and a minus voltage is applied to the second electrode 13, a plus charge 31*a* is emitted from the first electrode 12 to the water 21, and a minus charge 31*b* stays in the second electrode 13. In this case, the plus charge 31*a* emitted to the water 21 is attracted to the minus charge 31*b* of the second electrode 13 by a coulomb force, and a contact-portion $P_2$ between the water 21 and the water-repellent film 15 becomes larger according to an applied voltage. In part (B) of FIG. 1, the form of the interface between the water 21 and the oil 22 viewed from the oil 22 is in a convex state, and the liquid lens 1 functions as a convex lens. It is also possible, by adjusting the voltage applied to the first electrode 12 and second electrode 13, to change the form of the interface between the water 21 and the oil 22 little by little.

Thus, according to the liquid lens 1, it is possible to implement a zoom function and a focus function by changing the form of the interface between the water 21 and the oil 22 without providing a mechanism moving the lens.

Here, the liquid lens 1 has the water 21 electrolyzed by the plus charge 31*a* emitted from the first electrode 12 to generate a gas. There is a problem that, as the glass container 11 does not pass the gas, the gas stays and generate bubbles in the water 21 and oil 22 over a long period of time and the bubbles cause scattering of the light, leading to deteriorated light transmission.

The liquid lens 1 is supposedly applied to a small device such as a cellular phone. There is a problem, however, that if the cellular phone is left in a high temperature environment such as inside of a car in midsummer, the water 21 evaporates and the performance of the lens is thereby deteriorated.

The present invention is based on a detailed analysis as described above.

Hereunder, the embodiments of the present invention will be described by referring to the drawings.

Figure 2:
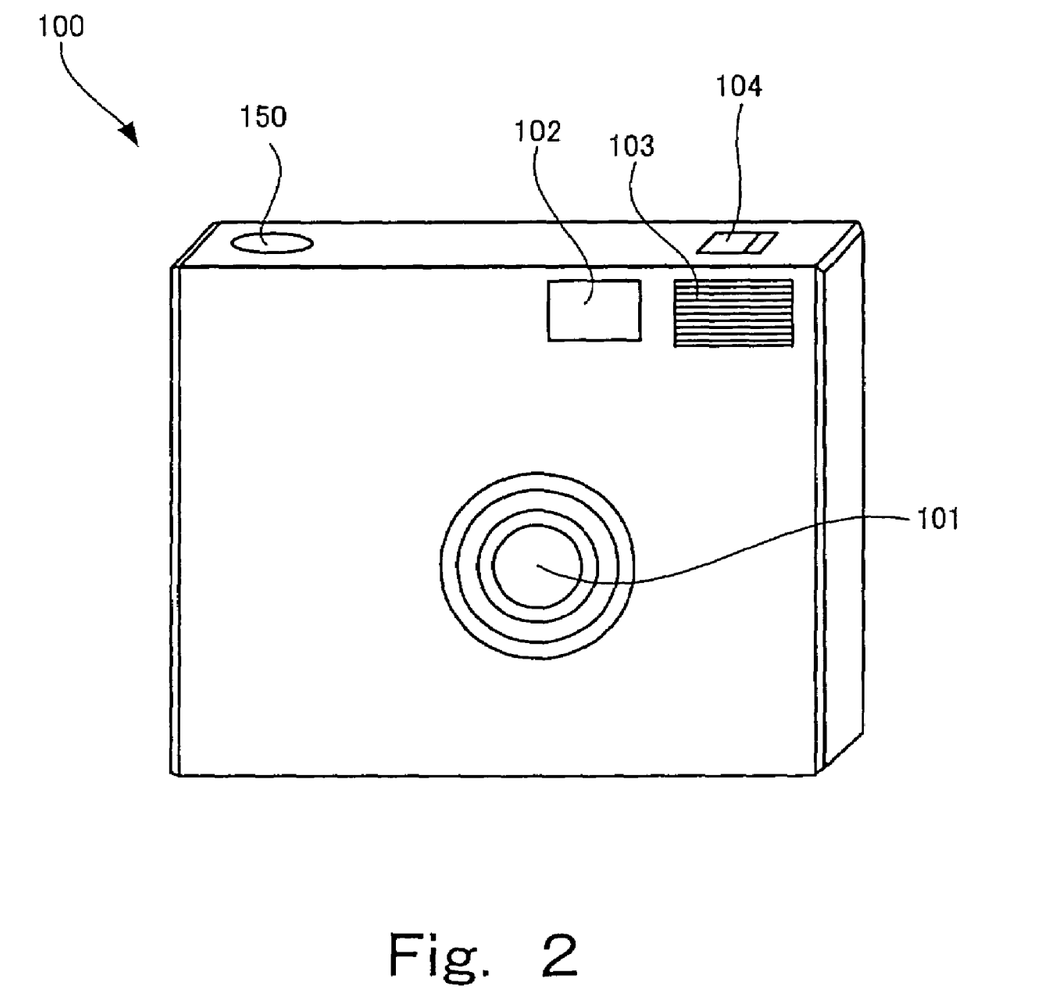
FIG. 2 is an outline perspective view obliquely from the front of a digital camera to which an embodiment of the present invention is applied.

FIG. 2 is an outline perspective view obliquely from the front of a digital camera to which an embodiment of the present invention is applied.

As shown in FIG. 2, an image taking lens 101 is provided at the center of the front of this digital camera 100. And an optical finder objective window 102 and a light emitting section 103 are provided at the upper portion of the front of the digital camera 100. Furthermore, the digital camera 100 has a sliding power switch 104 and a release switch 150 provided on a top surface thereof.

Figure 3:
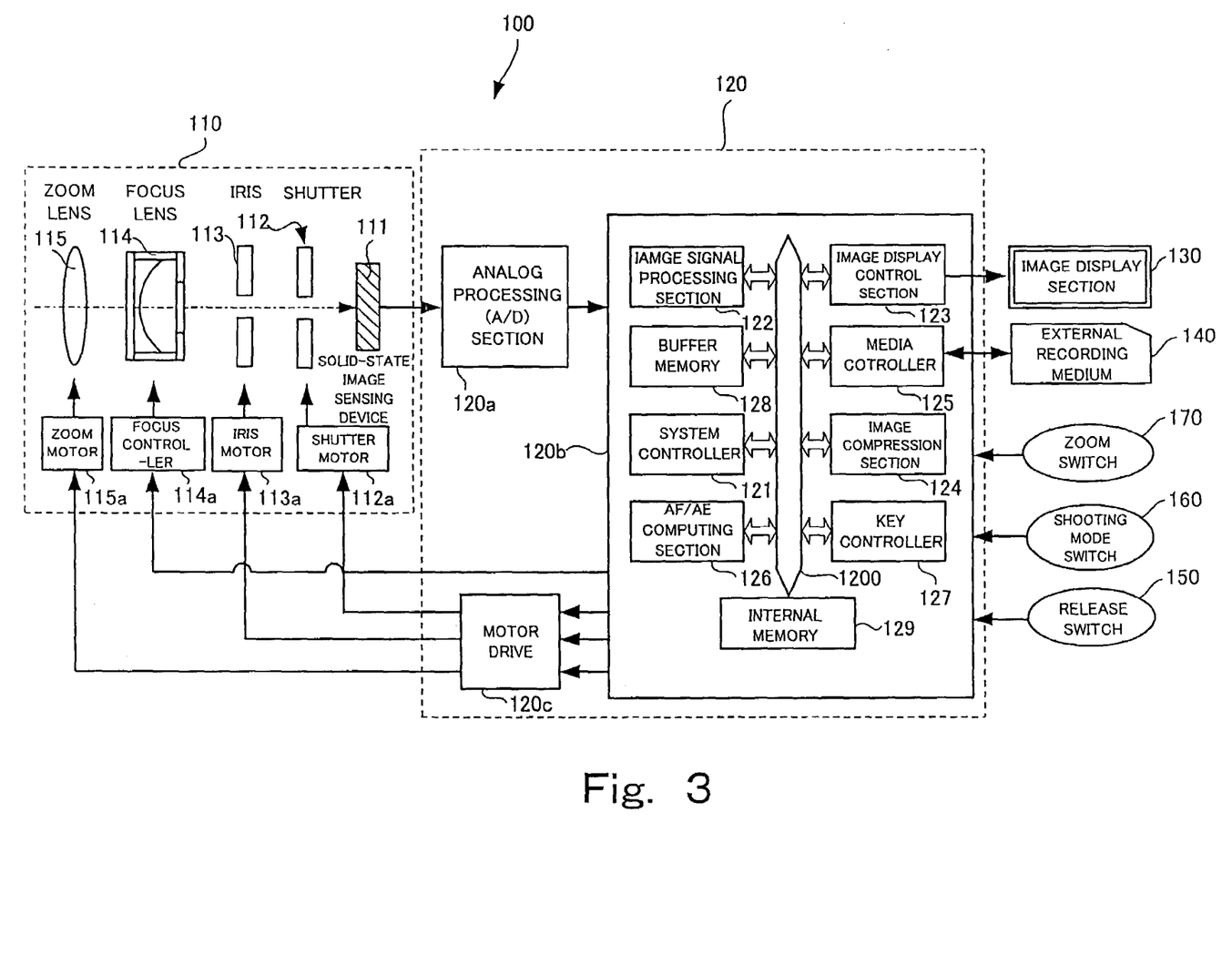
FIG. 3 is a schematic block diagram of the digital camera shown in FIG. 1.

FIG. 3 is a schematic block diagram of the digital camera 100 shown in FIG. 1.

As shown in FIG. 3, a breakdown of the digital camera 100 is roughly divided into a shooting optical system 110 and a signal processing section 120. In addition, the digital camera 100 has an image display section 130 displaying shot images, an external recording medium 140 recording shot image signals, a zoom switch 170 having various processes for shooting performed by the digital camera 100, a shooting mode switch 160 and a release switch 150 provided thereon.

First, a configuration of the shooting optical system 110 will be described by referring to FIG. 3.

As for the digital camera 100, subject light gets incident from the left of FIG. 3 and passes through an iris 113 adjusting a light volume of the subject light via a zoom lens 115 and a focus lens 114 so as to focus on a solid-state image sensing device 111 thereafter in the case where a shutter 112 is open. The solid-state image sensing device 111 is equivalent to an example of an image pickup device according to the present invention. The shooting optical system originally has multiple lenses placed therein, where at least one of the multiple lenses is significantly involved in focus adjustment while relative positions of the lenses are involved in focal length. FIG. 3 schematically shows the lens involved in change in the focal length as the zoom lens 115 and also schematically shows the lens involved in the focus adjustment as the focus lens 114.

The zoom lens 115, iris 113 and shutter 112 are driven by a zoom motor 115*a*, an iris motor 113*a* and a shutter motor 112*a* to move respectively. The focus lens 114 has a focus controller 114*a* changing the form of the focus lens 114 provided thereto instead of the motor. Instructions to actuate the zoom motor 115*a*, iris motor 113*a* and shutter motor 112*a* are conveyed from a digital signal processing section 120*b* in the signal processing section 120 through a motor driver 120*c*, and an instruction to actuate the focus controller 114*a* is directly conveyed from the digital signal processing section 120*b*.

The zoom lens 115 is moved by the zoom motor 115*a* in a direction along an optical axis. As the zoom lens 115 is moved to a position according to a signal from the signal processing section 120, the focal length changes and a shooting magnification is decided.

The focus lens 114 is a lens intended to implement a TTLAF (Through The Lens Auto Focus) function. In general, the TTLAF function detects a contrast of the image signal obtained by the solid-state image sensing device 111 with an AF/AE computing section 126 of the signal processing section 120 while moving the focus lens in the direction along an optical axis, and adjusts the focus lens 114 to a point of focus by setting a lens position at which the contrast hits a peak as the point of focus. It is possible, with the TTLAF function, to automatically focus on and shoot a subject of which contrast hits a peak (that is, the nearest subject). According to the present embodiment, the nearest subject is focused on by changing a lens form of the focus lens 114 with the focus controller 114*a* instead of moving the focus lens 114. The configuration of the focus lens 114 and a method of changing the lens form will be described in detail later.

The iris 113 is driven based on an instruction provided from the AF/AE computing section 126 of the digital signal processing section 120*b* so as to adjust the light volume of the subject light.

The configuration of the shooting optical system 110 is as described above.

Subsequently, the configuration of the signal processing section 120 will be described. A subject image provided on the solid-state image sensing device 111 in the shooting optical system is read as the image signal by an analog processing (A/D) section 120*a*. An analog signal is converted to a digital signal by the analog processing (A/D) section 120*a* so as to be supplied to the digital signal processing section 120*b*. The digital signal processing section 120*b* has a system controller 121 placed thereon, where signal processing in the digital signal processing section 120*b* is performed according to a program indicating a procedure of an operation in the system controller 121. Data passing is performed via a bus 1200 between the system controller 121 and an image signal processing section 122, an image display control section 123, an image compression section 124, a media controller 125, the AF/AE computing section 126, a key controller 127, a buffer memory 128, and an internal memory 129. The internal memory 129 operates as a buffer on performing the data passing via the bus 1200. The internal memory 129 has data turning to a variable according to progress on a handling process of each section written thereto as needed, where an adequate process is performed by referring to the data in the system controller 121, image signal processing section 122, image display control section 123, image compression section 124, media controller 125, AF/AE computing section 126 and key controller 127. To be more specific, the instruction from the system controller 121 is conveyed to the sections via the bus 1200 so as to start the handling process of each section. And the data of the internal memory 129 is rewritten according to the progress on the process, and is further referred to on the system controller 121 side to control the operations of the sections. In other words, power is turned on, and the process of each section is started according to the procedure of the program in the system controller 121. For instance, if the release switch 150, zoom switch 170 and shooting mode switch 160 are operated, information on that operation is conveyed to the system controller 121 via the key controller 127. And the process according to the operation is performed according to the procedure of the program in the system controller 121.

If a release operation is performed, image data read from the solid-state image sensing device is converted from the analog signal to the digital signal by the analog processing (A/D) section 120a. The digitized image data is stored once in the buffer memory 128 in the digital signal processing section 120b. An RGB signal of the digitized image data is converted to an YC signal by the image signal processing section 122. Furthermore, compression called JPEG compression is performed by the image compression section 124 so that the image signal becomes an image file and is recorded on the external recording medium 140 via the media controller 125. The image data recorded as the image file is reproduced by the image display section 130 through the image display control section 123. During this process, the AF/AE computing section 126 performs calculations of the focus adjustment and exposure adjustment based on the RGB signal. The AF/AE computing section 126 detects the contrast from the RGB signal by a subject distance for the sake of the focus adjustment. Based on this detection result, the focus adjustment is performed by the focus lens 114. The AF/AE computing section 126 also extracts a luminance signal from the RGB signal, and detects a luminance of field from it. Based on this result, the exposure adjustment is performed by the iris 113 so that the light volume of the subject light given to the solid-state image sensing device becomes adequate.

The digital camera 100 is basically configured as described above.

Here, the present invention in the digital camera 100 is characterized by the focus lens 114. Hereunder, the focus lens 114 will be described in detail.

Figure 4:
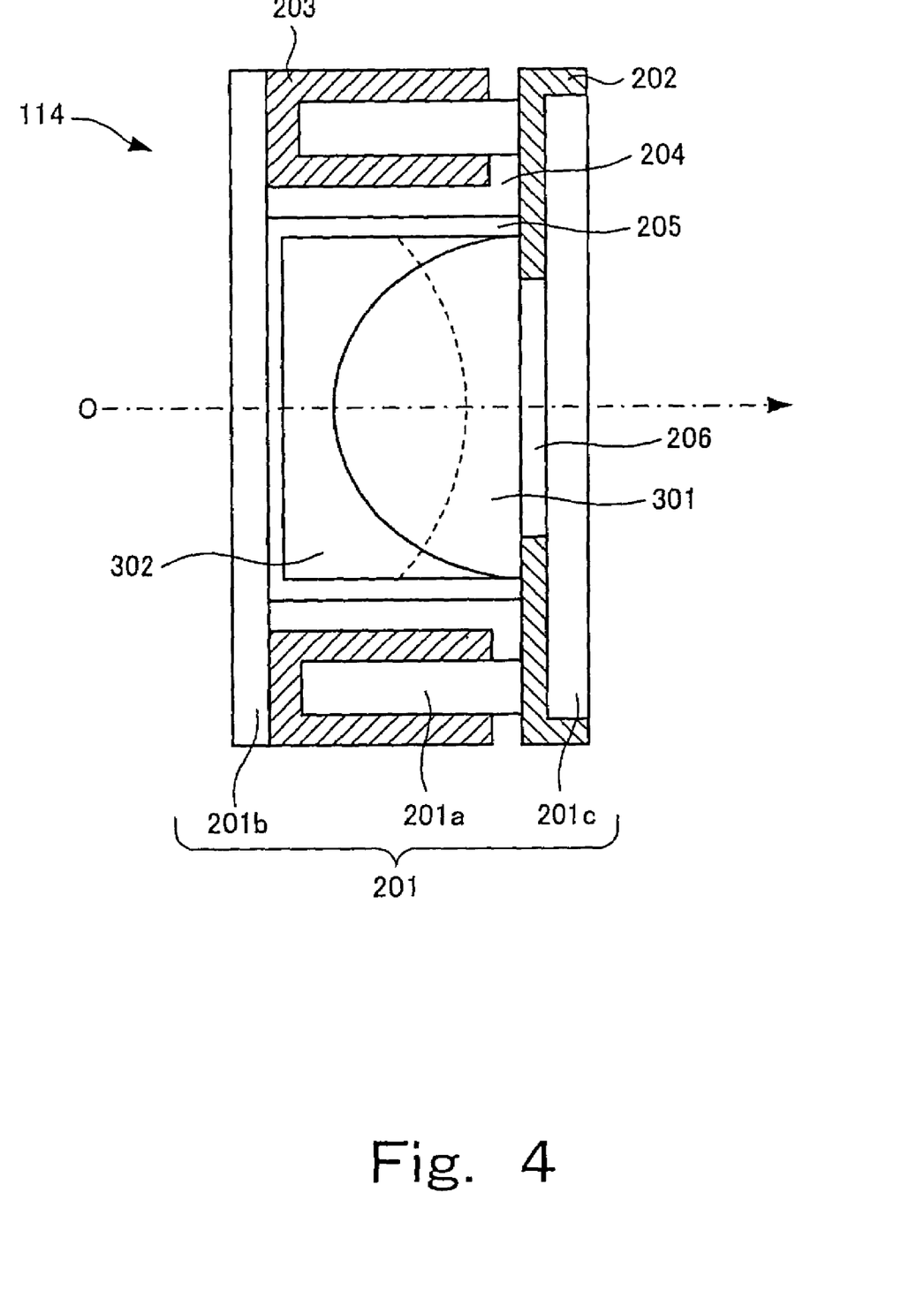
FIG. 4 is a schematic block diagram of a focus lens.

FIG. 4 is a schematic block diagram of the focus lens. A description will be given by referring to the side on which the light gets incident (left side of FIG. 4) as a front side and the side on which the light is emitted (right side of FIG. 4) as a back side with the subject light incident from the left side of FIG. 4 to the direction of the arrow O.

The focus lens 114 is formed by accommodating an ionic liquid 301 and an insulating liquid 302 unmixable with the ionic liquid 301 in a liquid container 201 composed of a tube 201a having both ends thereof closed up by caps 201b and 201c. The liquid container 201 is composed of clear glass, and is equivalent to an example of the liquid container according to the present invention.

A liquid-contacting surface (inner surface) of the cap 201c closing up a back-end of the tube 201a is covered with high-wettability film 206 which is highly wettable by the ionic liquid 301. The inner surface of the liquid container 201 other than the portion covered with the high-wettability film 206 is covered with a low-wettability film 205 which is less wettable by the ionic liquid 301 than the insulating liquid 302.

The liquid container 201 is also equipped with a first electrode 202 contacting the liquid and placed as if sandwiching the high-wettability film 206, an insulating film 204 sandwiched between the tube 201a and the low-wettability film 205, and a second electrode 203 insulated from the liquid by the insulating film 204. The first electrode 202 and second electrode 203 are connected to the focus controller 114a shown in FIG. 3, and the voltage is applied between these electrodes by the focus controller 114a. The first electrode 202 is equivalent to an example of the first electrode according to the present invention, and the second electrode 203 is equivalent to an example of the second electrode according to the present invention. The focus controller 114a is equivalent to an example of the control section according to the present invention.

The ionic liquid 301 and the insulating liquid 302 of mutually different refractive indexes are accommodated in the liquid container 201. According to the present embodiment, 1-ethyl-3-methyl-imidazolium hexafluorophosphate (made by Tokyo Kasei) is applied as the ionic liquid 301, and an organic solvent (made by ISOPAR: Exxon) is applied as the insulating liquid 302. An imidazolium salt compound applied as the ionic liquid 301 is relatively easy to obtain, and so it can reduce the manufacturing cost of the focus lens 114. The ionic liquid 301 is equivalent to an example of the ionic liquid according to the present invention, and the insulating liquid 302 is equivalent to an example of the insulating liquid according to the present invention.

In the state of having no voltage applied between the first electrode 202 and the second electrode 203, the ionic liquid 301 repels the low-wettability film 205 so that the interface between the ionic liquid 301 and the insulating liquid 302 will be in the form indicated in full line.

If the focus controller 114a applies the voltage mutually between the first electrode 202 and the second electrode 203 according to the instruction from the signal processing section 120 shown in FIG. 3, electric charge is emitted from the first electrode 202 to the ionic liquid 301 and the charge of reverse polarity to the charge emitted to the ionic liquid 301 gathers on the second electrode 203. The charge emitted to the ionic liquid 301 and the charge of the second electrode 203 draw each other with the coulomb force so that the charge in the ionic liquid 301 is attracted around the low-wettability film 205. Consequently, the interface between the ionic liquid 301 and the insulating liquid 302 changes to the form indicated by a dotted line in FIG. 4 for instance.

The TTLAF function is implemented by the following procedure by using the focus lens 114.

First, the voltage applied to the first electrode 202 and second electrode 203 is changed little by little by the focus controller 114a so that the image signal is obtained by the solid-state image sensing device 111 shown in FIG. 3 while having the form of the interface between the ionic liquid 301 and the insulating liquid 302 changed. Subsequently, the contrast of an image pickup signal is detected by the AF/AE computing section 126, and the voltage at which the contrast hits a peak is applied to the first electrode 202 and the second electrode 203. Thus, it is possible, by doing a photo shoot in a state of having the lens form determined, to focus on the subject at the nearest position.

As the electric charge is emitted from the first electrode 202 to the ionic liquid 301, a weak current passes through the ionic liquid 301. However, the ionic liquid 301 is not easily electrolyzed, and so even if the digital camera 100 is used for a long period of time, bubbles are not generated in the liquid container 201 and the light transmission can be maintained for a long period of time.

The ionic liquid 301 does not evaporate even at high temperature so that the digital camera 100 of the present embodiment can obtain a high-quality shot image even when using the digital camera 100 outdoors or in the car.

This concludes the description of the first embodiment of the present invention.

Here, the optical element of the present invention has an advantage that its optical performance is maintained even in the high temperature environment. A description will be given as to second and third embodiments exploiting this advantage hereunder.

First, a description will be given as to the second embodiment in which the optical element of the present invention is applied to a monitoring system having a photographic device installed outdoors. As the first embodiment and the second embodiment have approximately the same device configuration, attention is paid to a difference from the first embodiment, and the same elements are given the same symbols to omit a description thereof.

Figure 5:
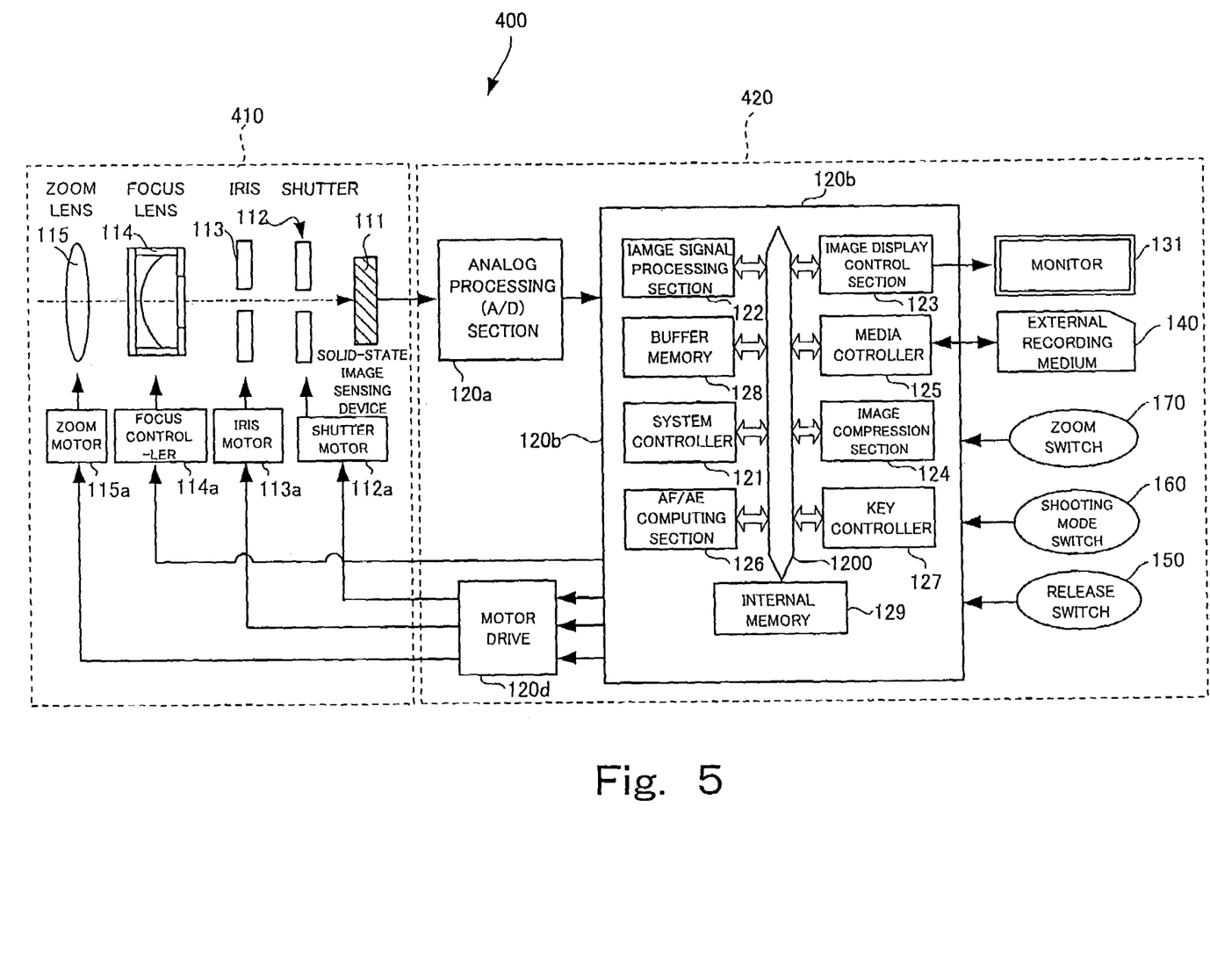
FIG. 5 is a schematic block diagram of a monitoring system to which a second embodiment of the present invention is applied.

FIG. 5 is a schematic block diagram of the monitoring system to which the second embodiment of the present invention is applied.

A monitoring system 400 shown in FIG. 5 is configured by connecting a photographic device 410 installed in an outdoor parking lot and so on to a monitoring device 420 installed in an observation room and so on by a network.

The photographic device 410 obtains various instructions from the monitoring device 420 via a motor driver 120d, and the subject is shot according to the instructions so as to generate digital shot image data. When the shot image data is generated, the voltage applied to the first electrode 202 and the second electrode 203 shown in FIG. 4 is controlled by the focus controller 114a, and the form of the interface between the ionic liquid 301 and the insulating liquid 302 is adjusted to focus on the subject. The generated shot image data is sent to the monitoring device 420.

The monitoring device 420 performs image processing to the shot image data generated by the photographic device 410, and displays the shot image represented by the shot image data on a monitor 131. The monitoring device 420 has various instructions inputted thereto by an operator having checked the shot image displayed on the monitor 131. The inputted various instructions are conveyed to the photographic device 410.

As the photographic device 410 is installed outdoors, it is required to operate normally in a considerably high-temperature environment in midsummer. The focus lens 114 of the photographic device 410 is downsized since no transfer mechanism is necessary, and the ionic liquid 301 not evaporating at atmospheric pressure is used as a conductive liquid so as to maintain high optical performance in the high temperature environment. The ionic liquid 301 has the advantages that it does not easily catch fire and is not easily electrolyzed. Therefore, the monitoring system 400 of the present embodiment can improve safety against a fire and device life.

Thus, even if used outdoors, the liquid lens using the ionic liquid as the conductive liquid has the optical performance maintained for a long period of time and prolongs the device life.

This concludes the description of the second embodiment, and a description will be given as to a third embodiment wherein the optical element of the present invention is applied to a printer having the image formed on paper with a laser beam. As the focus lens 114 of the first embodiment (refer to FIG. 4) and the lens applied to the third embodiment have approximately the same configuration, only the difference from the first embodiment will be described by using FIG. 4 in the description of the third embodiment.

Figure 6:
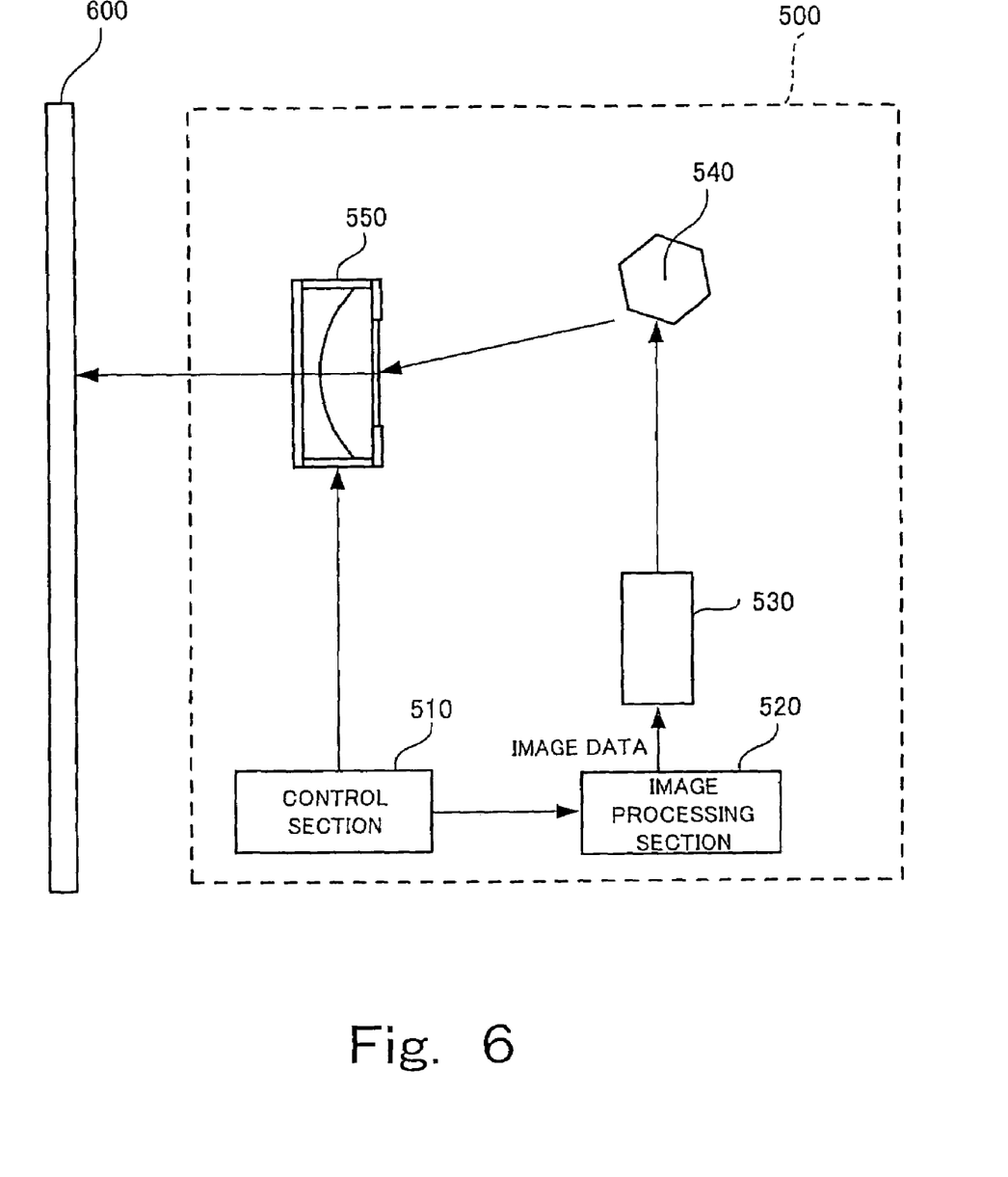
FIG. 6 is a schematic block diagram of a printer to which a third embodiment of the present invention is applied.

FIG. 6 is a schematic block diagram of the printer to which the third embodiment of the present invention is applied.

A printer 500 has a control section 510 controlling various elements of the printer 500, an image processing section 520 generating the image data representing an output image, a laser emitting section 530 emitting the laser beam based on the image data, a prism 540 refracting the laser beam, and a lens 550 condensing the laser beam on paper 600.

For instance, the image data obtained by reading an original image is obtained by the image processing section 520, and undergoes predetermined image processing therein. The image data after the image processing is sent to the laser emitting section 530.

The laser emitting section 530 emits the laser beam based on the image data sent from the image processing section 520. The emitted laser beam is refracted by the prism 540 and gets incident on the lens 550.

The lens 550 has the same configuration as the focus lens 114 of the first embodiment shown in FIG. 4. The control section 510 controls the voltage applied to the first electrode 202 and the second electrode 203 of the lens 550 and adjusts the form of the interface between the ionic liquid 301 and the insulating liquid 302 of the lens 550 so as to condense the laser beam on the paper 600. The control section 510 is equivalent to an example of the control section according to the present invention.

The paper 600 has a sensitive material applied on its surface. If the laser beam is irradiated by the lens 550, the image according to the laser beam is formed on the paper 600.

Here, when forming the image, the inside of the lens 550 is heated at considerably high temperature by the laser beam. However, the lens 550 has the ionic liquid 301 applied thereto so as to maintain the high optical performance even in the high temperature environment. For this reason, the printer 500 can form the high-quality image for a long period of time.

Thus, the liquid lens using the ionic liquid as the conductive liquid is also applicable to the apparatus generating high heat such as the laser beam.

Here, the description is given as to the example of the case where the two kinds of liquid of the ionic liquid and insulating liquid are accommodated in the liquid container. However, the liquid container according to the present invention may accommodate three or more kinds of liquid.

The description is also given as to the example of the case where the optical element of the present invention is applied to the focus lens. However, the optical element of the present invention may also be applied to the zoom lens.

Subsequently, a note will be appended as to various forms adoptable to component parts configuring the present invention.

<Ionic Liquid>

The ionic liquid according to the present invention may be anything. However, it should preferably be an imidazolium salt compound, a pyridinium salt compound, ammonium salt compound or a phosphonium salt compound. To be more precise, it may be 1-ethyl-3-methyl-imidazolium chloride, 1-ethyl-3-methyl-imidazolium bromide, 1-ethyl-3-methylimidazolium iodide, 1-ethyl-3-methyl-imidazolium trifluoro-methane sulfonate, 1-ethyl-3-methyl-imidazolium tetrafluoroborate, 1-ethyl-3-methyl-imidazolium hexafluorophosphate, 1-n-butyl-3-methyl-imidazolium chloride, 1-n-butyl-3-methyl-imidazolium bromide, 1-n-butyl-3-methyl-imidazolium tetrafluoroborate, octyl-triphenyl-phosphonium bromide, methyl-tributyl-ammonium tosylate, methyl-tributyl-ammonium chloride or methyl-tributyl-ammonium bromide. It should desirably be the imidazolium salt compound, and preferably a 1-ethyl-3-methyl-imidazolium salt compound or a 1-n-butyl-3-methyl-imidazolium salt compound.

The ionic liquid according to the present invention should desirably have a configuration with a fluorine-substituted anion pair from a viewpoint of low viscosity and high speed of response. For instance, it may be trifluoro-methane sulfonate salt, pentafluoro-ethane sulfonate salt, hexafluorophosphate salt or tetrafluoroborate salt.

The ionic liquid according to the present invention may also be a mixture of two or more kinds of ionic liquid. It is also possible to add an additive to the ionic liquid for the sake of adjusting the refractive index, viscosity and surface tension of the ionic liquid. The additive may be anything, for example, a low-molecular organic compound, a polymer inorganic compound or a metallic salt compound for instance.

<Insulating Liquid>

The insulating liquid according to the present invention should desirably be an organic solvent. Furthermore, it should preferably be a hydrocarbon (hexane, heptane, pentane, octane or isopar and so on), a hydrocarbon aroma compound (benzene, toluene, xylene, mesitylene and so on), a halogen hydrocarbon (difluoropropane, dichloroethane, chloroethane, promoethane and so on), a halogen hydrocarbon aroma compound (chlorobenzene and soon) or an ether compound (dibutyl ether, anisole, diphenyl ether and so on).

A combination of the ionic liquid and insulating liquid applied to the present invention should desirably have the mutual difference in the refractive index becoming larger. A desirable difference in the refractive index is between 0.05 and 0.5, and preferably between 0.1 and 0.2.

Here, the description is given as to the basic embodiments for the sake of realizing the concept of the present invention. To put the optical element adopted by the present invention in practical use, it should preferably be designed to prevent a problem that dirt and droplets adhere onto a light path and deteriorate the lens performance.

For instance, it is desirable to provide the water-repellent film on an outer surface (hereafter, this surface is referred to as a light transmitting surface) intersecting with the light path of the container accommodating the liquids. It is possible, by providing water-repellency to the light transmitting surface, to prevent adherence of the dirt and droplets so as to maintain high light transmission of the optical element. The material composing the water-repellent film should desirably be a silicone resin, an organopolysiloxane block copolymer, a fluorinated polymer or a polytetrafluoroethane.

It is desirable to provide the hydrophilic film on the light transmitting surface of the container configuring the optical element. It is also possible to prevent the adherence of the dust by providing hydrophilic oil-repellency to the light transmitting surface. The hydrophilic film should desirably be the one composed of an acrylate polymer or the one having a surface-active agent such as a non-ionic organo-silicone surface-active agent applied thereto. As for the method of making the hydrophilic film, plasma polymerization of a silane monomer or an ion beam process is applicable.

It is also desirable to provide a photo catalyst such as a titanium oxide on the light transmitting surface of the container configuring the optical element. It is possible to decompose a smear with the photo catalyst reacting to the light and thus to keep the light transmitting surface clean.

It is also desirable to provide an antistatic film on the light transmitting surface of the container configuring the optical element. If the light transmitting surface of the container has static electricity accumulated thereon or becomes charged with the electrode, there is a possibility that the dirt and dust may adhere to the light transmitting surface. It is possible, by providing the antistatic film to the light transmitting surface, to prevent adherence of such undesired substances and thus to maintain the light transmission of the optical element. It is desirable that the antistatic film be composed of a polymer alloy material. And it is especially desirable that the polymer alloy be the one having a polyether, a polyether-ester-amide or a cation group or Reo Mix (product name, Dai-ichi Kogyo Seiyaku Co., Ltd.). It is also desirable that the antistatic film be made by a mist method.

It is also possible to apply an antifouling material to the container configuring the optical element. A fluorocarbon resin is desirable as the antifouling material. To be more precise, a fluorine-containing alkyl-alkoxysilane compound, a fluorine-containing alkyl group-containing polymer or an oligomer. And the one having a functional group bridgeable with the thermosetting resin is especially desirable. An added amount of the antifouling material should desirably be a minimum amount necessary to implement an antifouling property.

What is claimed is:

1. An optical element comprising:
   a liquid container transmitting light at least in a predetermined optical axis direction, the liquid container containing an insulating liquid and an ionic liquid being mutually immiscible and optically transparent, and having different refractive indices;
   a first electrode contacting the ionic liquid in the liquid container; and
   a second electrode insulated from the ionic liquid in the liquid container.

2. The optical element according to claim 1, wherein the insulating liquid is an organic medium.

3. The optical element according to claim 1, wherein the insulating liquid is a hydrocarbon organic medium.

4. The optical element according to claim 1, wherein the ionic liquid is an imidazolium salt compound.

5. The optical element according to claim 1, wherein said first electrode is placed towards the light outgoing side of said container.

6. The optical element according to claim 1, wherein a high wetability film sandwiched between the first electrode is placed at the light outgoing side of said container.

7. The optical element according to claim 1, wherein said second electrode is arranged on the sides of cap holding liquid, of said container.

8. The optical element according to claim 1, wherein said ionic liquid is not electrolyzed.

9. The optical element according to claim 1, wherein said ionic liquid does not evaporate at high temperature.

10. The optical element according to claim 1, wherein said ionic liquid is substantially only cationic and anionic compound.

11. The optical element according to claim 1, wherein the ionic liquid is a pyridinium salt compound.

12. The optical element according to claim 1, wherein the ionic liquid is an ammonium salt compound.

13. The optical element according to claim 1, wherein the ionic liquid is a phosphonium salt compound.

14. A lens unit comprising:
a liquid container transmitting light at least in a predetermined optical axis direction, the liquid container containing an insulating liquid and an ionic liquid being mutually immiscible and optically transparent, and having different refractive indices;
a first electrode contacting the ionic liquid in the liquid container; and
a second electrode insulated from the ionic liquid in the liquid container,
wherein a form of an interface between the insulating liquid and the ionic liquid varies according to a voltage applied between the first electrode and the second electrode.

15. An image pickup apparatus comprising:
a liquid container transmitting light at least in a predetermined optical axis direction, the liquid container containing an insulating liquid and an ionic liquid being mutually immiscible and optically transparent, and having different refractive indices;
a first electrode contacting the ionic liquid in the liquid container;
a second electrode insulated from the ionic liquid in the liquid container;
a control section varying a form of an interface between the insulating liquid and the ionic liquid by applying a voltage between the first electrode and the second electrode; and
an image pickup device which has subject light having passed through the insulating liquid and the ionic liquid focused on its surface to generate an image signal representing the subject light.

* * * * *